US008862481B2

(12) United States Patent
Young et al.

(10) Patent No.: US 8,862,481 B2
(45) Date of Patent: Oct. 14, 2014

(54) METHOD AND SYSTEM FOR COLLECTING, MANAGING AND REPORTING FEEDLOT DATA AND FEED ADDITIVE CONSUMPTION DATA

(75) Inventors: Joseph Young, Olathe, KS (US); Marcel Sarzen, Dunwoody, GA (US)

(73) Assignee: Eli Lilly and Company, Indianapolis, IN (US)

( * ) Notice: Subject to any disclaimer, the term of this patent is extended or adjusted under 35 U.S.C. 154(b) by 1330 days.

(21) Appl. No.: 11/771,628

(22) Filed: Jun. 29, 2007

(65) Prior Publication Data

US 2007/0288257 A1    Dec. 13, 2007

Related U.S. Application Data

(63) Continuation-in-part of application No. 11/046,318, filed on Jan. 28, 2005, now abandoned.

(60) Provisional application No. 60/539,685, filed on Jan. 28, 2004.

(51) Int. Cl.
| | |
|---|---|
| G06Q 30/02 | (2012.01) |
| G06Q 10/10 | (2012.01) |
| G06Q 10/06 | (2012.01) |
| G06Q 30/06 | (2012.01) |
| G06Q 10/08 | (2012.01) |
| A01K 29/00 | (2006.01) |
| A01K 5/02 | (2006.01) |
| A23K 1/18 | (2006.01) |

(52) U.S. Cl.
CPC .............. *A01K 29/00* (2013.01); *G06Q 10/103* (2013.01); *A01K 5/02* (2013.01); *A23K 1/1813* (2013.01); *G06Q 10/06375* (2013.01)
USPC ........................................................ 705/1.1

(58) Field of Classification Search
CPC ..................................................... G06Q 10/103
USPC ..................................................... 705/1.1–912
See application file for complete search history.

(56) References Cited

U.S. PATENT DOCUMENTS

| 4,706,610 A | 11/1987 | Morgan, Jr. |
| 4,712,511 A | 12/1987 | Zamzow |

(Continued)

FOREIGN PATENT DOCUMENTS

| EP | 0139624 A | 5/1985 |
| WO | 0247473 A | 6/2002 |

OTHER PUBLICATIONS

International Search Report and Written Opinion issued in related PCT Patent Application Serial No. PCT/US08/68821 dated Nov. 28, 2008, 16 pages.

(Continued)

*Primary Examiner* — Jonathan Ouellette
(74) *Attorney, Agent, or Firm* — Faegre Baker Daniels LLP

(57) ABSTRACT

Methods and systems for collecting, managing and reporting feedlot data and feed additive consumption data are provided. More particularly, methods of determining effects of feed additives on livestock and methods of determining a number of doses of animal health product provided to livestock are disclosed. One method of determining effects of a feed additive on livestock includes steps: determining feed additive consumption by correlating feed consumption data to additive levels contained in feed; and matching feed additive consumption to a live performance record, a harvest performance record, and/or an animal health performance record. In another embodiment, a method of determining a number of doses of animal health product provided to livestock includes steps: determining a total quantity of animal health product provided to the livestock; determining a dose amount for the animal health product; and dividing the total quantity of animal health product provided by the dose amount.

13 Claims, 6 Drawing Sheets

(56) References Cited

U.S. PATENT DOCUMENTS

| | | | |
|---|---|---|---|
| 4,733,971 A * | 3/1988 | Pratt | 366/141 |
| 5,673,647 A | 10/1997 | Pratt | |
| 5,782,201 A | 7/1998 | Wells | |
| 6,000,361 A | 12/1999 | Pratt | |
| 6,135,055 A | 10/2000 | Pratt | |
| 6,211,789 B1 | 4/2001 | Oldham et al. | |
| 6,318,289 B1 | 11/2001 | Pratt | |
| 6,342,839 B1 | 1/2002 | Curkendall et al. | |
| 6,516,746 B2 | 2/2003 | Pratt | |
| 6,664,897 B2 | 12/2003 | Pape et al. | |
| 6,805,075 B2 * | 10/2004 | Pratt | 119/51.02 |
| 6,995,675 B2 | 2/2006 | Curkendall et al. | |
| 7,026,939 B2 | 4/2006 | Letkomiller et al. | |
| 2002/0116134 A1 | 8/2002 | Harada | |
| 2002/0158765 A1 | 10/2002 | Pape et al. | |
| 2003/0233984 A1 | 12/2003 | van De Ligt | |
| 2004/0155782 A1 | 8/2004 | Letkomiller et al. | |
| 2004/0226519 A1 * | 11/2004 | Doucette et al. | 119/51.02 |
| 2005/0258967 A1 | 11/2005 | Poliska | |
| 2006/0028013 A1 | 2/2006 | Schmitt et al. | |
| 2006/0132317 A1 | 6/2006 | Letkomiller et al. | |

OTHER PUBLICATIONS

File History from related European Patent Application Serial No. 05712154.3, dated Nov. 8, 2005 through Feb. 23, 2009, 185 pages.
www.emergeinteractive.com—PCC Feedyard Services.
www.beef4u.com.
Complete File History for related U.S. Appl. No. 11/046,318, as of Oct. 22, 2008.
Publication of International Search Report for related Application PCT/US2005/002585, dated Dec. 7, 2006.
Initial Publication of related PCT Patent Application PCT/US2005/00285, dated Aug. 11, 2005.
International Preliminary Report on Patentability Chapter 1 for Related PCT Patent Application PCT/US2005/002585, dated Sep. 19, 2006.
Written Opinion of the International Search Authority for related PCT Patent Application PCT/US2005/002585, dated Sep. 19, 2006.
Office Action issued in related Canadian Patent Application 2,690,204, issued Sep. 28, 2011, 2 pages.
Office Action issued in related Canadian Patent Application 2,690,204, issued Dec. 22, 2010, 2 pages.
Response to Office Action issued in related Canadian Patent Application 2,690,204, filed Jun. 10, 2011, 11 pages.

* cited by examiner

METHOD AND SYSTEM FOR COLLECTING, MANAGING AND REPORTING FEEDLOT DATA AND FEED ADDITIVE CONSUMPTION DATA

CROSS-REFERENCE TO RELATED APPLICATIONS

This application is a continuation-in-part of U.S. patent application Ser. No. 11/046,318, filed Jan. 28, 2005 now abandoned, which claims priority to U.S. Provisional Patent Application Ser. No. 60/539,685, filed Jan. 28, 2004, both of which are hereby incorporated by reference to the extent permitted by law.

BACKGROUND

The present invention is directed to a method for collecting, managing and reporting feedlot data and feed additive consumption data. In particular, the present invention is directed to a method of collecting information gathered from standard livestock accounting and medical systems, managing the information, and reporting the information in a useful format.

The beef industry in particular is constantly evolving and, recently, began consolidating. As a result, cattle and beef marketing methods have evolved at a rapid rate. Branded beef, while still a small portion of the total beef supply, is growing in volume as packers and retailers look for ways to differentiate and add value to their products. Many "blockbuster" patents covering animal health products are also expiring thereby leading to competition from generic manufacturers. These generic manufacturers are looking for ways to acquire market share from the pioneer manufacturers while managing price erosion.

This environment in the beef industry is driving a need for accurate, timely information and knowledge that enables feedlot managers, marketing managers, loan managers, and the like, to guide their companies, and that enables nutritionists, veterinarians, and others to understand and improve the effects of animal health products (e.g., feed additives, etc.). While the beef industry currently uses sophisticated accounting and medical system software to track individual feedlot or packer performance, there is a need in the art for a system to collect data from many sources in a meaningful way so as to provide valuable knowledge and information to the players in this ever-changing industry in order to aid feeders, packers, animal health companies, and the like to identify strengths, weaknesses, opportunities and niches that may be exploited. While the beef industry is referred to specifically herein, it should be appreciated that the methods disclosed herein are not limited to beef applications.

BRIEF SUMMARY

Methods of determining effects of feed additives on livestock and methods of determining a number of doses of an animal health product that have been provided to livestock are disclosed herein. According to one embodiment, a method of determining effects of a feed additive on livestock includes the steps: (a) determining feed additive consumption by correlating feed consumption data to additive levels contained in the feed; and (b) matching the feed additive consumption to at least one of a live performance record, a harvest performance record, or an animal health performance record.

According to another embodiment, a method of determining effects of feed additives on livestock includes the steps: (a) providing a processor; (b) providing a memory device; (c) inputting feed records including feed consumption data from a feedlot accounting system into the memory device; (d) inputting feed ingredients including additive levels into the memory device; (e) having the processor determine feed additive consumption by correlating the feed consumption data in the memory device to the additive levels in the memory device; and (f) having the processor match the feed additive consumption to at least one of a live performance record, a harvest performance record, or an animal health performance record.

According to yet another embodiment, a method of determining a number of doses of an animal health product that have been provided to livestock includes the steps: (a) determining a total quantity of the animal health product provided to the livestock; (b) determining an intended dose amount for the animal health product; and (c) dividing the total quantity of the animal health product provided by the intended dose amount to determine a number of doses of the animal health product that have been provided to the livestock.

DETAILED DESCRIPTION

Feedlots are typically used for finishing livestock before harvest and may contain thousands of animals in an array of pens. Diets may be tightly controlled in feedlots to obtain desirable animal characteristics (e.g., good health, marbling, etc.), and the livestock may quickly gain large amounts of weight while in the feedlots. Feed records are generally maintained by the feedlots at the pen level using a feedlot accounting system, as the cost of feed is generally passed through to the owner of the livestock.

To obtain the desirable animal characteristics while at the feedlots, the feed often includes additives (e.g., one or more ionophore, feed grade antibiotic, beta agonist, direct fed microbial, vitamin, mineral, coccidiostat, paraciticide, estrus suppressor, and/or nutritional supplement, etc.) and/or other animal health products (e.g., vitamins, minerals, pharmaceuticals, etc.) are provided to the livestock (e.g., through injection, orally, etc.). The amount and types of feed additives vary depending on the feed used. In other words, all types of feed do not include the same types and amounts of feed additives. Similar to food labels used on products for human consumption, animal feed also has labels that provide a listing of contents (which includes the feed additives and is also referred to herein as "feed ingredients") and respective amounts of the contents (including the feed additives).

In addition to closely monitoring the type and amount of feed consumed by the livestock at the pen level, many feedlots also record (typically at the pen level) the number of days on feed, the number of animals in the pen, live performance records (e.g., pen weight at various points in time, etc.), and animal health performance records (e.g., pharmaceutical usage, biological agent usage, health practice protocols, health problems experienced, etc.). The costs associated with animal health products are often passed through to the owner of the livestock in the same way as feed costs are passed through, and as such, these records are often also kept in the feedlot's accounting system. At harvest, harvest performance records (e.g., quality, yield, etc.) are recorded by slaughterhouses.

Figure 1:
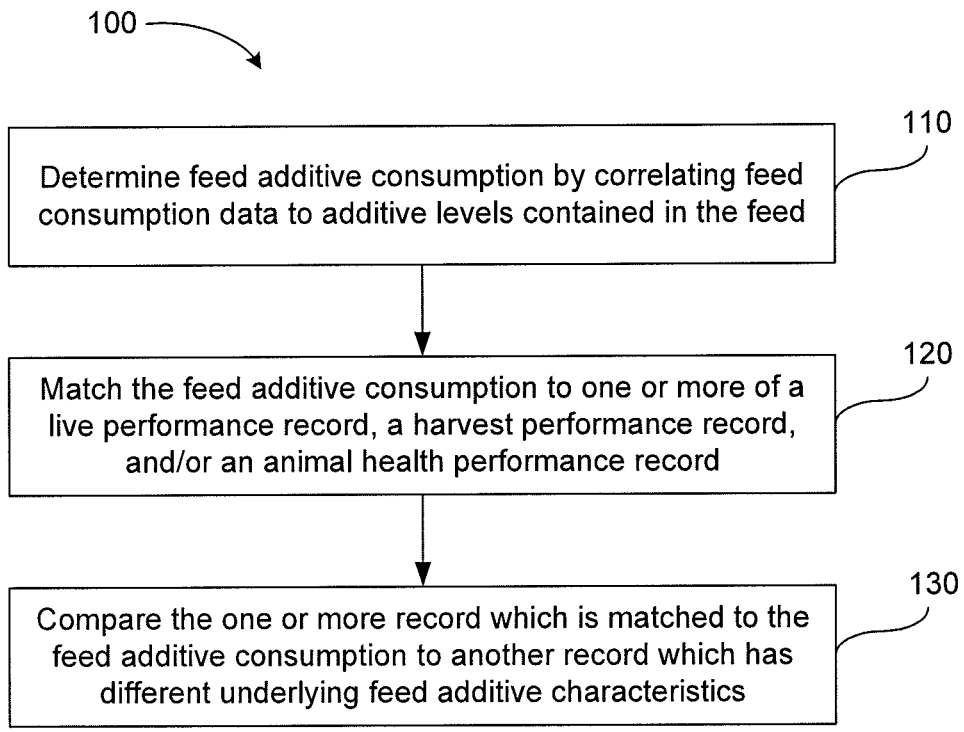
FIG. 1 is a flowchart of a method of determining effects of a feed additive on livestock according to an embodiment.

FIG. 1 shows a method 100 of determining effects of a feed additive on livestock. At a step 110, feed additive consumption is determined by correlating feed consumption data to additive levels contained in the feed. The feed consumption data may be determined by obtaining feed records that include aggregate feed consumption data (e.g., feed consumption data for an entire pen) from a feedlot accounting system, as shown in FIG. 2 for example.

Figure 2:
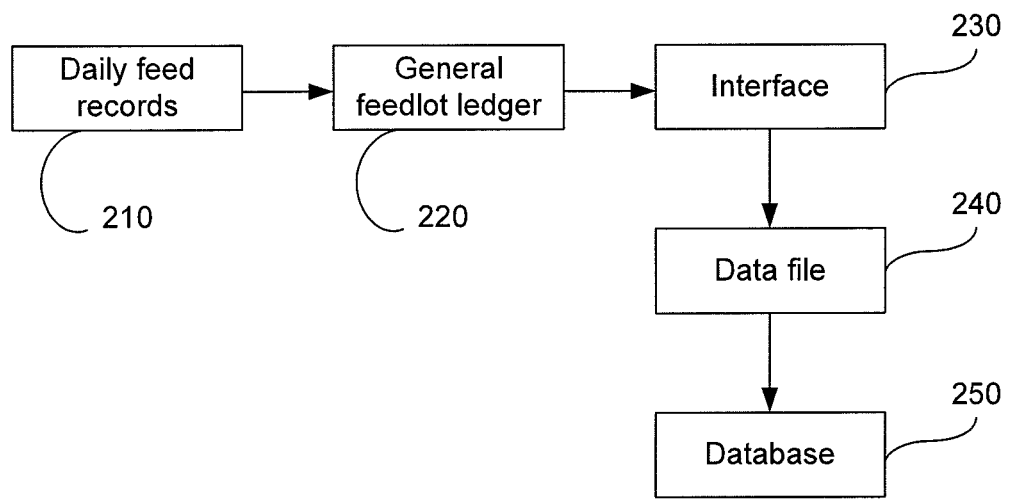
FIG. 2 is a flowchart showing an exemplary flow of information according to an embodiment.

More particularly, as shown in FIG. 2, daily feed records 210 (e.g., for a pen) may be input into a general accounting ledger 220 for the feedlot. An interface 230 may pull the feed records 210 from the general accounting ledger 220 and create a data file 240. The data file 240 may be a XML data file, an EXCEL data file, or any other appropriate data file. The data file 240 may then be sent (including through automated email, otherwise over the internet, through courier on a data storage device, or by any other appropriate method) to a database 250 for use in the method 100.

Figure 3:
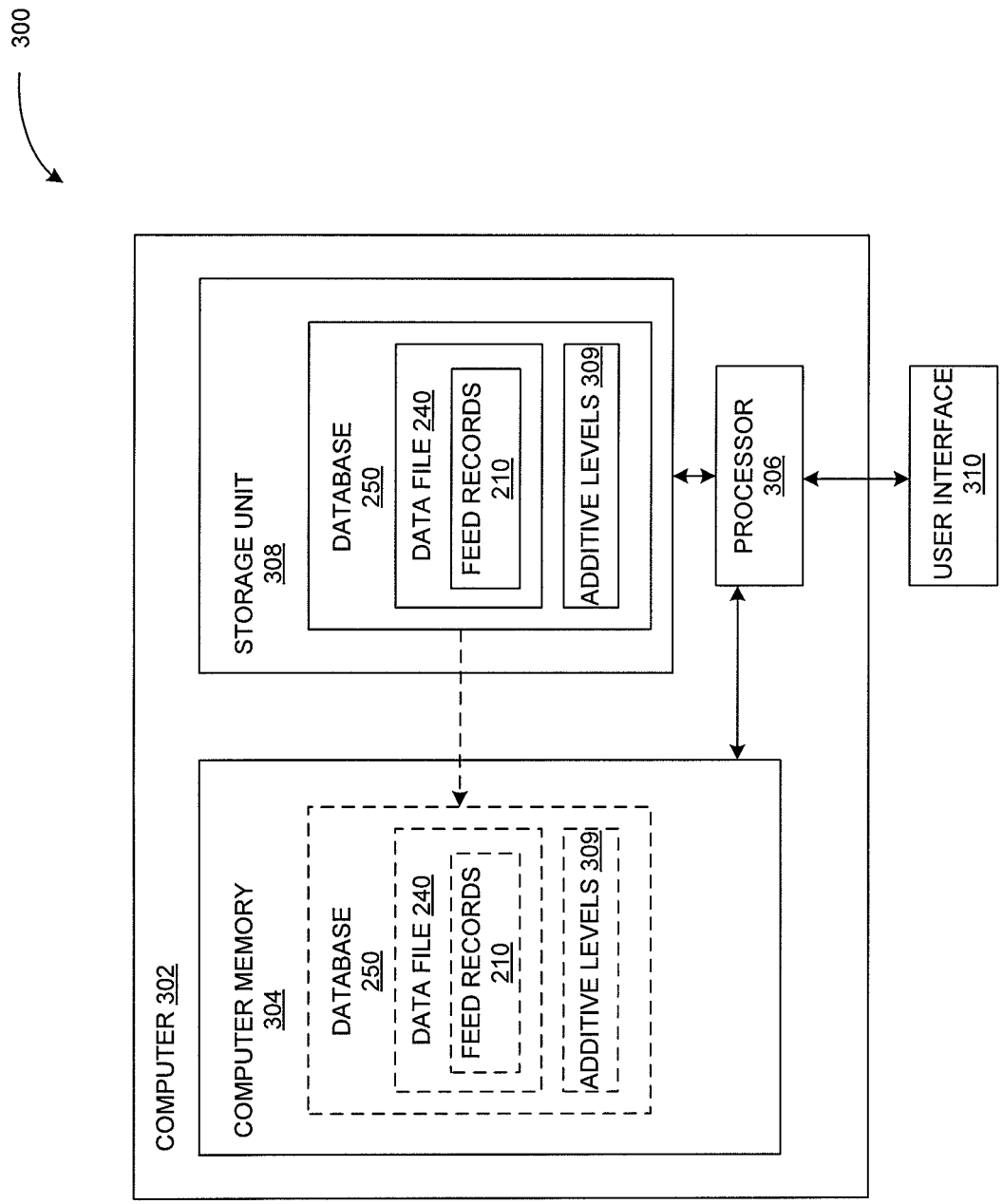
FIG. 3 is a schematic illustration of a system according to an embodiment for use in implementing methods disclosed herein.

As shown in FIG. 3, the database 250 may be maintained in a memory device 304 in an exemplary system 300 for implementing the method 100. The system 300 includes a computer 302 with the computer memory 304, a processor 306, a storage unit 308, and a user interface 310. The storage unit 308 may be, for example, a disk drive that stores programs and data of the computer 302. It should be understood that the database 250 and the data contained therein could be stored in storage units of separate computers and that data could be transferred between those storage units; the transfer of data is known in the art.

Figures 4A, 4B:
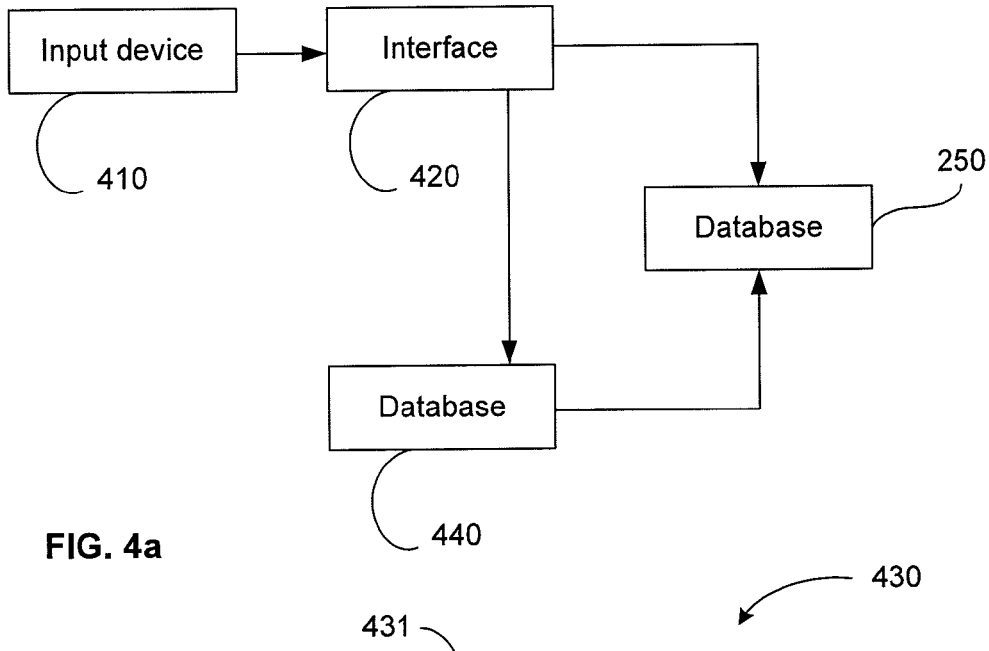
FIG. 4a is a flowchart showing an exemplary flow of information according to an embodiment.
FIG. 4b is an exemplary electronic data entry sheet according to an embodiment.

Returning to step 110 shown in FIG. 1, the additive levels contained in the feed may be obtained from the feed label. As shown in FIG. 4a, the database 250 maintained in the memory device 304 may receive the additive levels through an input device 410, either directly or through an interface 420. The input device 410 may be a keyboard, a scanner, or any other appropriate input device. FIG. 4b shows an exemplary electronic data entry sheet 430 having a respective entry field 431 for feed ration name, a respective entry field 432 for feed additive product class, a respective entry field 433 for feed additive product, a respective entry field 434 for inclusion rate of feed additive product, and a respective entry field 435 for inclusion rate units. Alternately, the additive levels may be input to the database 250 from a database 440 maintaining additive levels for various feeds. The database 440 may optionally be built over time from data entered through the input device 410. It should be understood that the database containing the additive levels could be separate from the database maintaining the feed records 110, though the additive levels appear in the database 250 at 309 in FIG. 3.

By correlating the feed consumption data to the additive levels contained in the feed in step 110 (e.g., by having the processor 306 correlate the feed consumption data in the memory device 304 to the additive levels 309 in the memory device 304,) the amount of additive consumed by the pen as a whole is calculated. To provide a standardized measurement, the amount of additive consumed by the pen as a whole may be divided by the number of animals in the pen, the number of days on feed, and/or another unit. The method continues from step 110 to step 120, where the feed additive consumption determined in step 110 is matched to a live performance record, a harvest performance record, and/or an animal health performance record. For example, an animal that received some approximate amount of feed additive per day may have a certain live weight, a certain pharmaceutical usage history, a certain biological agent usage history, a certain quality, and/or a certain yield. The processor 306 may match the feed additive consumption (calculated as set forth above) to a live performance record, a harvest performance record, or an animal health performance record input to the memory device 304.

At step 130 shown in FIG. 1, the live performance record, harvest performance record, and/or animal health performance record for the animal that received some approximate amount of feed additive per day is compared to a live performance record, harvest performance record, and/or animal health performance record for some other animal that did not receive the same approximate amount of feed additive per day (an animal with different underlying feed additive characteristics). This may be accomplished, for example, by the processor 306. Statistical methods may additionally be used in comparing records for groups of animals that received an approximate amount of feed additive per day to records for groups of animals that did not receive the same approximate amount of feed additive per day, and using the method 100 may therefore provide helpful information as to what types and amounts of feed additives should be given to various livestock.

Figure 5:
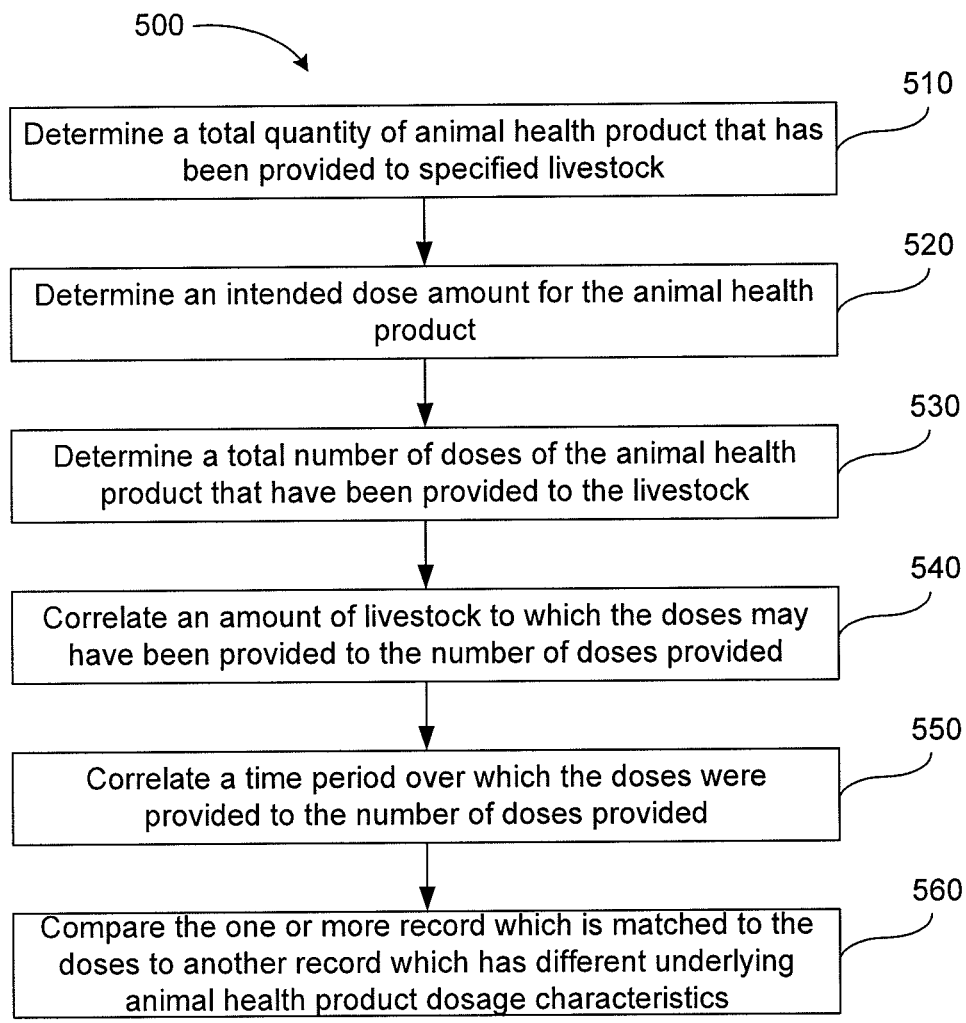
FIG. 5 is a flowchart of a method of determining a number of doses of an animal health product that have been provided to livestock according to an embodiment.

FIG. 5 shows a method 500 of determining a number of doses of an animal health product that have been provided to livestock. At a step 510, a total quantity of the animal health product that has been provided to the livestock (often at the pen level) is determined. This quantity may be determined by obtaining health product records that include quantity data (e.g., health product usage data for an entire pen) from a feedlot accounting system, as shown in FIG. 6 for example.

Figure 6:
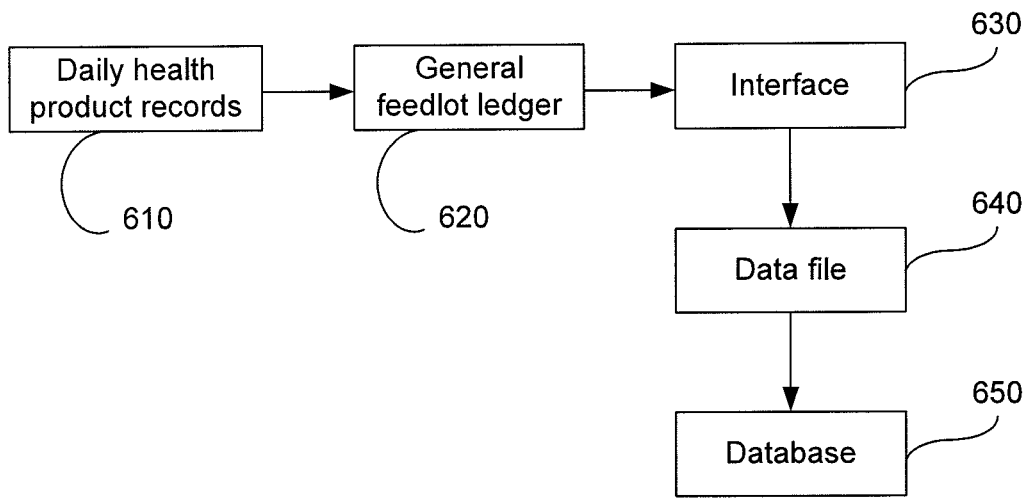
FIG. 6 is a flowchart showing an exemplary flow of information according to an embodiment.

More particularly, as shown in FIG. 6, daily health product records 610 (e.g., for a pen) may be input into a general accounting ledger 620 for the feedlot. An interface 630 may pull the health product records 610 from the general accounting ledger 620 and create a data file 640. The data file 640 may be a XML data file, an EXCEL data file, or any other appropriate data file. The data file 640 may then be sent (including through automated email, otherwise over the internet, through courier on a data storage device, or by any other appropriate method) to a database 650 for use in the method 500.

Figure 7:
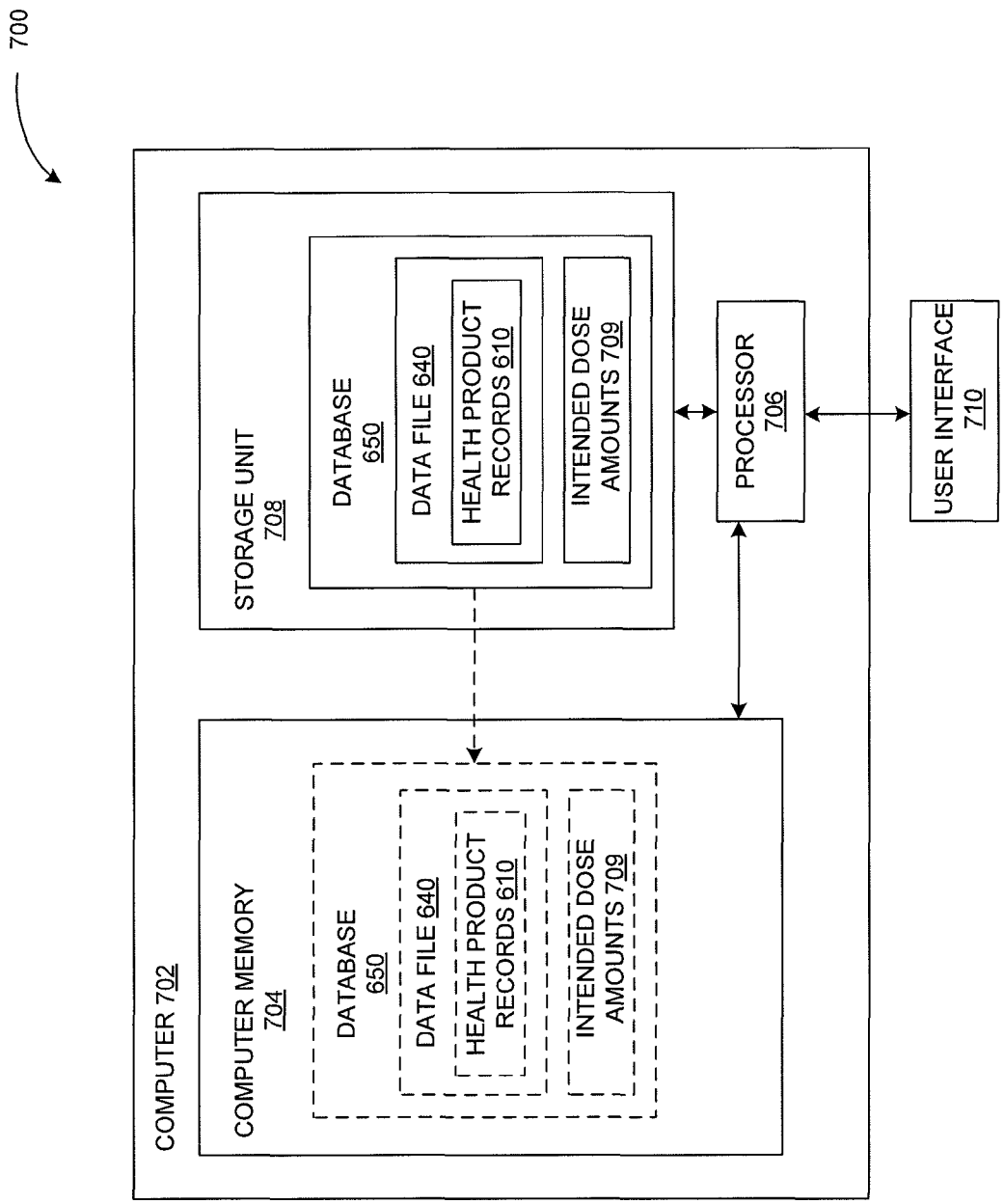
FIG. 7 is a schematic illustration of a system according to an embodiment for use in implementing methods disclosed herein.

As shown in FIG. 7, the database 650 may be maintained in a memory device 704 in an exemplary system 700 for implementing the method 500. The system 700 includes a computer 702 with the computer memory 704, a processor 706, a storage unit 708, and a user interface 710. The storage unit 708 may be, for example, a disk drive that stores programs and data of the computer 702. It should be understood that the database 650 and the data contained therein could be stored in storage units of separate computers and that data could be transferred between those storage units; the transfer of data is known in the art.

Figure 8:
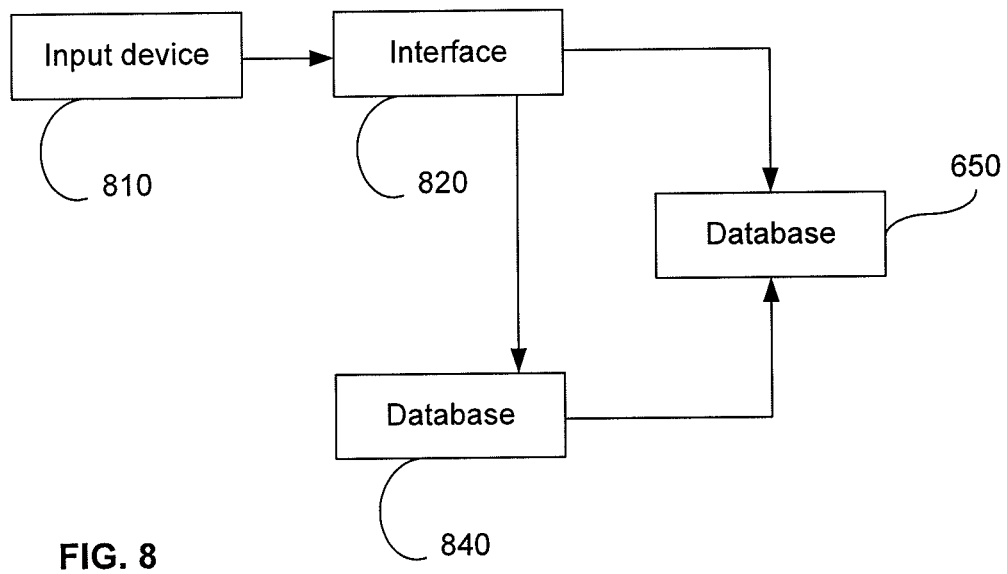
FIG. 8 is a flowchart showing an exemplary flow of information according to an embodiment.

Returning to FIG. 5, the method 500 proceeds from step 510 to step 520. At step 520, an intended dose amount for the animal health product is determined. The intended dose amount of the health product may generally be obtained from the health product's label. As shown in FIG. 8, the database 650 maintained in the memory device 704 may receive the intended dose amount through an input device 810, either directly or through an interface 820. The input device 810 may be a keyboard, a scanner, or any other appropriate input device. Alternately, the intended dose amount may be input to the database 650 from a database 840 maintaining intended dose amounts for various health products. The database 840 may optionally be built over time from data entered through the input device 810. It should be understood that the database containing the intended dose amounts could be separate from the database maintaining the quantity of health products used (the health product records 610), though the intended dose amounts appear in the database 650 at 709 in FIG. 7.

At step 530 shown in FIG. 5, the total quantity of the animal health product that was provided is divided by the intended dose amount to determine a number of doses of the animal health product that have been provided to the livestock. This may be accomplished, for example, by having the processor 706 divide the daily health product records 610 in the data file 640 by the intended dose amount 709.

The method 500 may proceed from step 530 to steps 540 and 550, where an amount of livestock to which the doses of animal health product may have been provided (e.g., a number of animals in a feedlot pen) and a time period over which the doses of animal health product were provided are correlated to the number of doses of the animal health product that have been provided (as determined at step 520). The number of animals in a pen and a time period for which those animals are in the pen are typically maintained by the feedlot and may be provided to the processor 706 in a manner similar to the health product records 610 as discussed above. By correlating to an amount of livestock and/or a time period, the number of doses of the animal health product may be standardized to allow comparison.

At step 560 shown in FIG. 5, an average live performance record, harvest performance record, and/or animal health performance record for an animal that received some average amount of health product per day (e.g., an average from one pen) is compared to a live performance record, harvest performance record, and/or animal health performance record for some other animal (or an average from another pen) that did not receive the same amount of health product per day. This may be accomplished, for example, by the processor 706. Statistical methods may additionally be used in comparing records for groups of animals that received an approximate amount of animal health product per day to records for groups of animals that did not receive the same approximate amount of feed additive per day, and using the method 500 may therefore provide helpful information as to what types and amounts of animal health products should be given to various livestock.

Those skilled in the art appreciate that variations from the specified embodiments disclosed above are contemplated herein. The description should not be restricted to the above embodiments or the accompanying figures, but should be measured by the following claims.

We claim:

1. A method of determining a number of doses of an animal health product that have been provided to livestock, the method comprising the steps:
    providing a processor;
    providing a memory device;
    inputting feed records including feed consumption data from a feedlot accounting system into the memory device, the feed consumption data corresponding to feed delivered to a plurality of feedlot pens including a first feedlot pen holding first livestock;
    inputting feed ingredients including an animal health product level into the memory device;
    having the processor determine a total quantity of animal health product provided to the first livestock by correlating the feed consumption data in the memory device to the animal health product level in the memory device;
    inputting an intended dose amount for the animal health product into the memory device; and
    having the processor divide the total quantity of the animal health product provided to the first livestock by the intended dose amount to determine a number of doses of the animal health product that have been provided to the first livestock.

2. The method of claim 1, wherein the animal health product is at least one of a vitamin, a mineral, or a pharmaceutical.

3. The method of claim 1, further comprising the step:
    having the processor correlate a time period over which the total quantity of animal health product was provided to the number of doses of the animal health product that have been provided.

4. The method of claim 1, further comprising the step:
    having the processor compute, based on the number of animals comprised in the first livestock and the number of doses of the animal health product that have been provided to the first livestock, a number of doses per animal.

5. The method of claim 1, further comprising the step:
    having the processor compare at least one of a live performance record, a harvest performance record, and an animal health performance record for the first livestock in the first feedlot pen to at least one of another live performance record, another harvest performance record, and another animal health performance record for second livestock in a second feedlot pen;
    wherein the second livestock in the second feedlot pen do not receive the same intended dose amount of the same animal health product provided to the livestock in the first feedlot pen.

6. The method of claim 1, wherein the intended dose amount is obtained from a product label for the animal health product.

7. The method of claim 5, further comprising, based on the comparison, providing information for determining what types and amounts of animal health product to give to livestock.

8. The method of claim 1, further comprising the following steps, performed by the processor:
    computing the number of doses per animal in the first livestock; and
    comparing at least one of a live performance record, a harvest performance record, and an animal health performance record for the first livestock to at least one of another live performance record, another harvest performance record and another animal health performance record for a second livestock in a second feedlot pen, the number of doses per animal provided to the second livestock being different than the number of doses per animal provided to the first livestock.

9. The method of claim 8, further comprising, based on the comparing, providing information for determining what types and amounts of animal health product to give to livestock.

10. A computer implemented method of determining what types and amounts of animal health product to give to livestock, the method comprising:
receiving with a second computing system feedlot data transmitted by a first computing system, the feedlot data including:
consumption data corresponding to feed delivered to a plurality of feedlot pens including a first feedlot pen and a second feedlot pen, each of the plurality of feedlot pens including one or more animals, the first feedlot pen receiving a first feed and the second feedlot pen receiving a second feed, at least one of the first feed and the second feed including an animal health product;
a first number of animals in the first feedlot pen; and
a second number of animals in the second feedlot pen;
computing, for the first feedlot pen based on the first feed and the first number of animals, a first animal health product dose;
computing, for the second feedlot pen based on the second feed and the second number of animals, a second animal health product dose, the second animal health product dose being different than the first animal health product dose; and
comparing, by the second computing system, at least one of a live performance record, a harvest performance record, and an animal health performance record, for an animal in the first feedlot pen, to at least one of another live performance record, another harvest performance record and another animal health performance record, for another animal in the second feedlot pen.

11. A computer implemented method as in claim 10, wherein the a first animal health product dose and the second animal health product dose are computed on a per animal basis.

12. A computer implemented method as in claim 11, wherein the a first animal health product dose and the second animal health product dose are computed on a per unit of time basis.

13. A computer implemented method as in claim 10, further comprising, based on the comparing, providing information for determining what types and amounts of animal health product to give to livestock.

* * * * *